Sept. 9, 1969            H. MARTIN            3,466,384

WATERPROOF CABLE JOINT

Filed March 29, 1968

INVENTOR.
Helmut Martin
BY
ATTORNEY

# United States Patent Office 3,466,384
Patented Sept. 9, 1969

3,466,384
WATERPROOF CABLE JOINT
Helmut Martin, Hannover, Germany, assignor to Kabel-
und Metallwerke Gutehoffnungshutte Aktiengesell-
schaft, Hannover, Germany, a corporation of Germany
Filed Mar. 29, 1968, Ser. No. 717,279
Claims priority, application Germany, Apr. 1, 1967,
K 61,877
Int. Cl. H02g 15/08, 15/24
U.S. Cl. 174—92      4 Claims

ABSTRACT OF THE DISCLOSURE

A joint construction for electrical cables having a high degree of impermeability to the transmission of water vapors by enclosing the joint in a metal foil portions seamed welded together and to the cable sheaths.

BACKGROUND OF THE INVENTION

In connecting electric cables to each other, and in particular with low frequency cables; cable sleeves are used to waterproof the joint. Usually, such sleeves are formed of plastic materials such as polyethylene; such sleeves being very light in comparison to the weight of the cables being joined and are readily handled.

However, such known plastic sleeves are not completely impermeable to water vapor. Several mg. of water can penetreate such plastic sleeves in the course of a day. The precise quantity of vapor so transmitted, varies with condition of the earth in which the cable is embedded. When the cable strands are insulated with paper wrappings or the like, the water absorbed by the insulation impairs the operation of the cable. While such defects may be readily traced and corrected; there is a considerable expenditure of time and money. With plastic insulation applied to the cable strands, detection of the impaired portions of cable is more difficult because the moisture tends to travel along the length of the cable and there is no swelling to give evidence of the presence of moisture.

Accordingly, an object of this invention is to provide an improved sleeve for cable joints in low frequency cables having the usual metal sheathing and plastic jacketing over the metal sheathing.

Another object of this invention is to provide a sleeve highly impermeable to the passage of water vapor which lends itself to a tight connection to the metal sheathing portions of the jointed cables.

Other objects of this invention will in part be obvious and in part hereinafter pointed out.

DESCRIPTION OF THE PREFERRED EMBODIMENT

Figure 1:
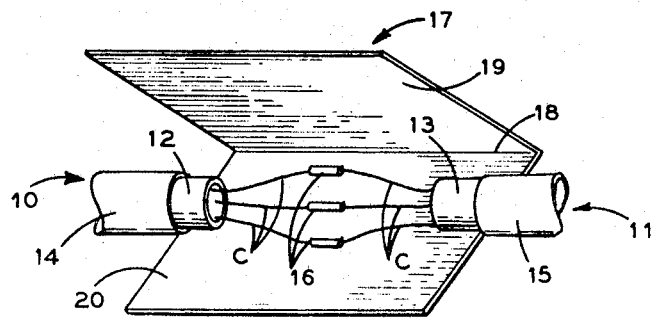
FIG. 1 is a perspective view showing the cable joint assembly embodying the invention, before the same has been sealed.
Figure 2:
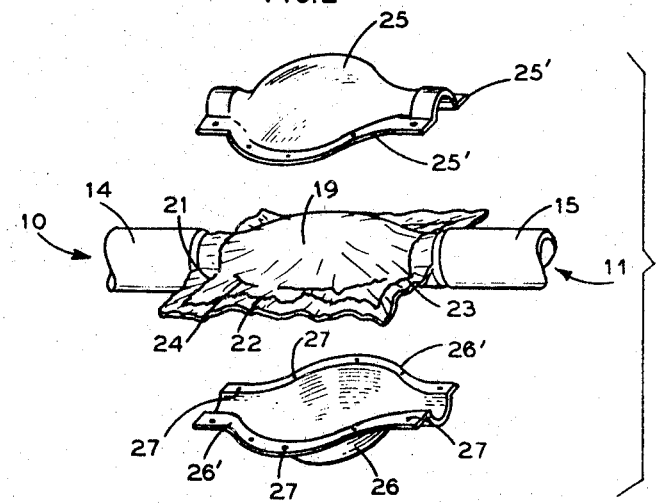
FIG. 2 is a view similar to that of FIG. 1, showing the assembly in a sealed condition.

As shown in FIG. 1, 10, 11 designate a pair of electrical cables having the usual metal sheathing 12, 13 and plastic jacketing 14, 15. The several conductors C, C' of the cables 10, 11 are respectively spliced as at 16, in a conventional manner.

The spliced conductors C, C' are prepared for enclosure by a water impermeable sleeve, by cutting back the plastic jacketing 14, 15, to expose the metal sheathing 12, 13. The water impermeable sleeve is constituted of metal foil generally indicated at 17, the same taking rectangular form and folded along a line 18 to provide panels 19, 20 lying on opposite sides of the conductor joints. The metal foil may be of aluminum, copper or the like. The superposed foil panels 19, 20 may be welded to the exposed metal sheathing portions 12, 13 and to each other; weld lines being indicated at 21, 22, 23 and 24.

Preformed plastic sleeves 25, 26 suitably shaped to fit the contours of the cable joint, are applied over the metal foil sleeve 17 and secured together along opposed flange portions 25', 26' by screws or other fasteners extending through spaced openings 27. Other means for joining the sleeves 25, 26 may be used.

The metal foil 17 may be coated with suitable synthetic resins derived from styrene, ethylene and other monomers. The plastic coating on the facing panels 19, 20 supplements the welding seams to insure a tight connection between the foil sleeve portions.

I claim:

1. In a cable joint for a pair of low frequency electric cables having spliced conductors, said cables having exposed metal sheathing portions at the joint, and a water impermeable sleeve enclosing the spliced conductors and sealed to opposed end portions of said cables, said sleeve comprising opposed metal foil portions, said foil portions being seam welded to each other and to exposed metal sheathing portions of the opposed end portions of said cables.

2. In a cable joint as in claim 1 and further including plastic sleeve means enclosing the metal foil sleeve.

3. In a cable joint as in claim 2 wherein said metal foil is of aluminum or copper.

4. In a cable joint as in claim 1 wherein the surfaces of the opposed metal foil portions are coated with synthetic resin.

References Cited

UNITED STATES PATENTS

| | | | |
|---|---|---|---|
| 1,947,454 | 2/1934 | Bennett | 174—93 |
| 3,419,669 | 12/1968 | Dienes | 174—84 |

DARRELL L. CLAY, Primary Examiner

U.S. Cl. X.R.

174—21, 88